(12) United States Patent
Borrell et al.

(10) Patent No.: US 11,136,883 B2
(45) Date of Patent: Oct. 5, 2021

(54) TRACER AND METHOD

(71) Applicant: JOHNSON MATTHEY PUBLIC LIMITED COMPANY, London (GB)

(72) Inventors: Neil Borrell, Cleveland (GB); Aidan David Brierley, Northumberland (GB)

(73) Assignee: Johnson Matthey Public Limited Company, London (GB)

( * ) Notice: Subject to any disclaimer, the term of this patent is extended or adjusted under 35 U.S.C. 154(b) by 124 days.

(21) Appl. No.: 14/916,240

(22) PCT Filed: Sep. 4, 2014

(86) PCT No.: PCT/GB2014/052685
§ 371 (c)(1),
(2) Date: Mar. 3, 2016

(87) PCT Pub. No.: WO2015/033146
PCT Pub. Date: Mar. 12, 2015

(65) Prior Publication Data
US 2016/0230543 A1    Aug. 11, 2016

(30) Foreign Application Priority Data

Sep. 5, 2013 (GB) ..................................... 1315848

(51) Int. Cl.
*E21B 47/11* (2012.01)
*C09K 8/03* (2006.01)
(Continued)

(52) U.S. Cl.
CPC ................ *E21B 47/11* (2020.05); *C09K 8/03* (2013.01); *C09K 8/70* (2013.01); *C09K 8/80* (2013.01)

(58) Field of Classification Search
None
See application file for complete search history.

(56) References Cited

U.S. PATENT DOCUMENTS 3,623,842 A    11/1971 Deans
4,755,469 A    7/1988 Showalter et al.
(Continued)

FOREIGN PATENT DOCUMENTS

CN    102 296 947 A    12/2011
EP    1991759 B2    11/2008
(Continued)

OTHER PUBLICATIONS

European Search Report, dated Feb. 5, 2014, from corresponding Application No. GB1315848.0.
(Continued)

*Primary Examiner* — Jill E Culler
(74) *Attorney, Agent, or Firm* — BakerHostetler

(57) ABSTRACT

A tracer material for tracing fluid flows from a hydrocarbon reservoir. The tracer material is a particulate tracer material including a plurality of particles of a porous particulate solid material, the particles having pores containing a tracer composition characterised in that a retaining material overlies the tracer composition in at least some of the pores. The retaining material retards the release of the tracer material so that the tracer is released at a more constant rate over a longer period than in the absence of the retaining material.

17 Claims, 5 Drawing Sheets

(51) Int. Cl.
*C09K 8/70* (2006.01)
*C09K 8/80* (2006.01)

(56) References Cited

U.S. PATENT DOCUMENTS

| | | |
|---|---|---|
| 5,077,417 A | 12/1991 | Smith, Jr. et al. |
| 5,077,471 A | 12/1991 | Smith, Jr. et al. |
| 7,334,486 B1 | 2/2008 | Klammler et al. |
| 7,431,849 B1 | 10/2008 | Swearingen et al. |
| 2004/0115378 A1 | 6/2004 | Dunaway et al. |
| 2006/0052251 A1 | 3/2006 | Anderson |
| 2006/0234870 A1 | 10/2006 | McCabe et al. |
| 2009/0087912 A1* | 4/2009 | Ramos ............ E21B 47/1015 436/27 |
| 2010/0307745 A1* | 12/2010 | Lafitte ............ E21B 47/1015 166/250.12 |
| 2011/0240287 A1 | 10/2011 | Hartshorne et al. |
| 2011/0277996 A1* | 11/2011 | Cullick ............ E21B 47/1015 166/250.12 |
| 2013/0126158 A1 | 5/2013 | Gupta et al. |
| 2014/0110102 A1* | 4/2014 | Hall ............ E21B 27/00 166/244.1 |
| 2014/0262247 A1* | 9/2014 | Duenckel ............ E21B 47/1015 166/250.12 |

FOREIGN PATENT DOCUMENTS

| | | |
|---|---|---|
| WO | 0181914 A1 | 11/2001 |
| WO | 20110141687 A2 | 11/2011 |
| WO | 2014/144464 A2 | 9/2014 |
| WO | 2015/033146 A1 | 3/2015 |

OTHER PUBLICATIONS

European Search Report, dated Sep. 7, 2015, from corresponding Application No. GB1415686.3.
European Search Report, dated Nov. 23, 2015, from corresponding Application No. GB1415686.3.
European Search Report, dated Feb. 11, 2016, from corresponding Application No. GB1415686.3.
International Search Report, dated Feb. 19, 2015, from corresponding PCT application.

* cited by examiner

TRACER AND METHOD

The present invention concerns the deployment of tracers within a subterranean well or reservoir for tracing fluid flows.

It is well known to place tracers in a well in order to detect flow of fluid from a part of the well where a tracer has been placed. Radioactive tracers have been widely used for many years in well-monitoring applications. As an example, see U.S. Pat. No. 5,077,471, in which radioactive tracers are injected into a perforated well-bore, sealed and then monitored for decay to indicate the fluid flow from the formation. U.S. Pat. No. 4,755,469 describes the use of rare metal tracers for tracing oil and associated reservoir fluids by mixing an oil-dispersible rare metal salt with oil or an oil-like composition, injecting the dissolved tracer composition into a subterranean reservoir and analysing oil fluids produced from a different part of the reservoir for the presence of the rare metal to determine whether the oil mixed with the tracer has been produced from the reservoir.

Hydraulic fracturing is common in the oil and gas exploration and production industry whereby a hydrocarbon-containing rock formation, or reservoir, is fractured in order to allow the hydrocarbon to flow out of the rock through the rock fractures. Many methods of fracturing a rock formation and maintaining a fracture open for the flow of hydrocarbon are known and practised in the industry. It is common to prop open a fracture by injecting proppant particles into the fracture so that flow of hydrocarbon from the fracture can be maintained. It is also known in the art to trace the flow of fluids from a reservoir, including fluids flowing after a fracturing operation, using tracers. For example, European Patent Number 1991759 describes a method of monitoring the flow of fluid within or from a reservoir comprising the steps of inserting a solid non-radioactive tracer into the reservoir by means of a perforation tool, thereafter collecting a sample of fluid within or flowing from the reservoir and analysing said sample to determine the amount of said tracer contained in the sample. From the presence or absence of tracer in the sample, its amount and other parameters such as timing of the sample collection etc., information about the fluid flow within the reservoir may be gathered. U.S. Pat. No. 3,623,842 describes a method of determining fluid saturations in reservoirs by injecting at least two tracers having different partition coefficients between fluid phases (e.g. oil and water) into the formation and monitoring the appearance of the two tracers in the produced fluids.

It is an object of the invention to provide a method of placing a tracer compound within a well penetrating a subterranean reservoir which provides advantages over prior art methods.

Figure 8A:
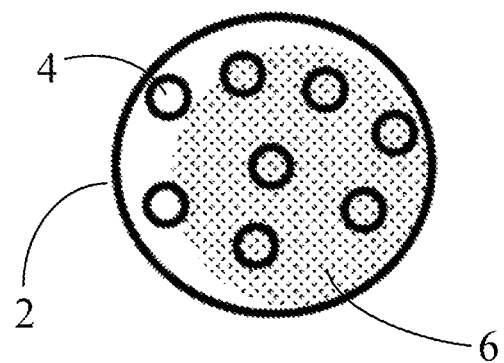
FIG. 8A provides a representation of an exemplary particle according to the present disclosure that includes pores and a retaining material that overlies a tracer composition in at least some of the pores.

According to the invention, and as shown in FIG. 8A, a particulate tracer material comprises a plurality of particles 2 of a porous particulate solid material, said particles having pores 4 containing a tracer composition characterised in that a retaining material 6 overlies said tracer composition in at least some of said pores.

A method, according to the invention, of tracing a flow of fluid from a hydrocarbon reservoir comprises the steps of placing within a well penetrating said reservoir a particulate tracer material according to the invention, containing a tracer composition, thereafter collecting a sample of fluids flowing from the well and analysing said sample to determine the presence or absence of said tracer composition. The method can optionally further comprise determining the concentration of one or more tracers in fluids flowing from the well. A method of tracing a flow of fluid from a hydrocarbon reservoir can comprise taking a plurality of samples of fluids flowing from the well over a period of time, analysing the samples and determining the concentrations of one or more tracers in the reservoir fluids over time. The fluid which is to be traced may be a hydrocarbon fluid, i.e. an oil or gas or alternatively an aqueous fluid such as produced water. The tracer composition may contain tracers for tracing hydrocarbon flow and a different tracer composition for tracing water flows.

A method, according to the invention, of making a particulate tracer material comprising the steps of impregnating a plurality of particles of a porous particulate solid material with a tracer composition in the form of a liquid or a solution, optionally removing a solvent from said particles, and then contacting said particles with a liquid precursor to a retaining material and treating the resulting particles to form a solid retaining material from said liquid precursor.

The porous particulate solid material may comprise an organic material such as fibers, ground almond shells, ground walnut shells, ground coconut shells, coffee grinds, plant seeds or plant pips, but is preferably an inorganic material, especially an inorganic oxide material or other ceramic material. Suitable materials include silica, alumina, including hydrated and partially hydrated forms of alumina, aluminosilicates, porous glasses, calcium carbonate, clays such as sepiolite, kaolins, bentonite, attapulgite, and halloysite, diatomaceous earth, activated carbon, porous glasses, zeolites, moler earth, fullers earth. The particles of porous material preferably have a porosity of at least 5 vol %, at least 10 vol %, at least 15 vol %, at least 20 vol % at least 25 vol %, or at least 30 vol %.

The tracer composition is selected to comprise at least one tracer compound which is not naturally found in the fluid, the flow of which is to be traced. Suitable hydrocarbon-soluble tracer compounds are known to the skilled person.

The tracer compound is preferably a liquid or solid at room temperature. More than one tracer compound may be incorporated into the tracer particle. The tracer compound may comprise a dye which can be detected by visual means or by a spectroscopic method. The dye may be coloured or not coloured to the eye. Fluorescent compounds, detectable by fluorescence spectroscopy, are well-known for use as tracers and may be suitable for this application. Chemical tracer compounds which are detected by gas chromatography, atomic absorption spectroscopy or other methods may be used. The tracer composition is preferably a solid or liquid which is soluble in or miscible with a hydrocarbon fluid, especially a naturally-occurring oil or gas or soluble in or miscible with an aqueous liquid. The tracer composition is preferably soluble in or miscible with hydrocarbon fluids in the form of naturally-occurring oil and gas found in subterranean reservoirs. The selection of suitable tracer compounds is known in the art and the skilled person is capable of selecting one or more appropriate tracer compounds.

Suitable tracer compounds include, but are not limited to classes of materials such as dyes, fluorescent materials, aromatic compounds (preferably halogenated aromatic compounds), cyclic compounds (preferably cycloalkanes, especially halogenated cycloalkanes) and aliphatic compounds (preferably halogenated aliphatic compounds). Each of these compounds having suitable functional groups, or derivatives of such functional groups, but not limited to: alkyl, alkenyl, alkynyl, nitro, aldehyde, haloformyl, carbonate ester, amine, hydroxyl, phenyl, benzyl, carboxylate, sulfonate, carbonyl, acetal, halogen, partially or completely halogenated hydrocarbon chains or cycles, carboxyl, ester, methoxy, ethoxy, hydroperoxy, peroxy, ether, sulfo, borono, borate, boronate, orthoester, carboxamide, amide, nitrile, isonitrile, thiol, sulphide, or sulfonyl, or any combination of those groups. Suitable tracers include but are not limited to 4-bromodiphenyl ether, 4-bromobenzophenone, heptadecafluoro-1-decane, 1,5-diaminoanthraquinone, (1-bromoethyl)benzene, 2-bromoethylethylether, 5-chloro-3-phenyl-2,1-benzisoxazole, 2,4'-dichloroacetophenone, and 1-chloroanthraquinone.

More than one tracer compound may be contained within the same tracer particle. Different combinations of tracers may be used in different tracer particles to identify different flows. Tracer particles containing different tracer compounds or different combinations of tracer compounds may be placed in different locations, e.g. at different parts of a well, so that fluid passing contacting each tracer material at its respective location may be identified. Groups of tracer particles can be associated with each other where there is one tracer per particle with different particles each having a different tracer being mixed together in specific ratios. Groups of tracer particles also can be associated with each other where there is one tracer per particle with different particles each having a different tracer being mixed together in specific ratios where there can be more than one particle having the same tracer.

The retaining material is a solid or viscous liquid or non-viscous liquid that retards the rate of discharge of the tracer compound from the tracer particle compared with the rate of discharge from a similar tracer particle in the absence of the retaining material. The term viscous liquid refers to a liquid having a viscosity greater than that of water under the same conditions. The term non-viscous liquid refers to a liquid having a viscosity the same as, or less than that of water under the same conditions. The retaining material is preferably present in or over at least a portion of the pores in the tracer particle and can also be present on at least a portion of the surface of the tracer particle. In one embodiment of the invention the particles are separate and free-flowing, i.e. they do not stick together. In this embodiment it is preferred that the retaining material is not present on the surface to an extent which causes the particles to stick together when made. The retaining material may comprise a polymeric material or a waxy organic material. Suitable polymers include polyurethanes, epoxy resins, polyesters, acrylics, polyvinyl acetate, polyvinyl alcohol, formaldehyde-based resins and cellulose compounds such as methylcellulose. When different tracer particles are used in a well, they may be designed to release tracer compounds at different rates by appropriate selection of the retaining material as well as the amount of the retaining material and how it is applied to the particles. The release rates of the tracer compounds can depend upon the solubility of the tracer in water and/or production fluid. One of ordinary skill in the art would be able to evaluate various retaining materials and select the appropriate retaining material and the amount of retaining material to use, as well as the best method of applying the retaining material to the particles by testing various materials under conditions appropriate to the environment in which they will be used. Tracer can be released at selective different rates into a well by altering the quantity of covering material to restrict the amount of fluid which encounters tracer or the rate at which the fluid encounters the tracer material or by choosing a tracer with a higher or lower solubility in the fluids produced by the well, thereby retarding or speeding the dissolution of the tracer into the flowing ambient fluid.

In this way fluid contacting the tracer materials may be detected at different stages in the production history of the well. The tracer compounds in each tracer particle may be the same or different. Different tracer particles containing different tracer compounds may be made readily identifiable by colouring the tracer particles or applying other visible indicators.

The particulate tracer material comprises a porous particulate solid material, at least one tracer and at least one retaining material. The particulate tracer material preferably comprises from 5-45 wt %, more preferably from 5-30% wt %, of retaining material. The particulate tracer material preferably comprises from 1-20 wt %, more preferably from 3-15 wt %, even more preferably from 5-10 wt % of the tracer composition. The particulate tracer material can comprise these materials in any weight combination within these ranges.

Examples of such combinations are shown below.

| Tracer | Retaining Material | Porous Particulate Solid Material |
|---|---|---|
| 5-45 | 1-20 | 35-94 |
| 5-45 | 3-15 | 40-92 |
| 5-45 | 5-10 | 45-90 |
| 5-30 | 1-20 | 50-94 |
| 5-30 | 3-15 | 55-92 |
| 5-30 | 5-10 | 60-90 |

The numbers in the table above are wt % of the material based on total weight of particulate tracer material The tracer particles may be made by first impregnating the porous particulate solid material with the tracer composition such that the tracer composition is at least partially absorbed into the pore structure of the porous particles. When one or more of the tracer compounds of the tracer composition are solid at room temperature, they may be impregnated in the form of liquids at a temperature above their melting point or in the form of a solution or dispersion in a solvent. The solvent may comprise another tracer compound or may be a non-tracer liquid. The solvent may be removed from the particle by drying following impregnation of the tracer composition or alternatively may remain within the tracer particle. When the tracer particle contains more than one tracer compound, each may be impregnated into the particle in a separate step but more preferably they are impregnated together as a mixture. The impregnation may be carried out by mixing the solid particles with the tracer composition in the form of a liquid. Alternatively the tracer composition may be applied by spraying or other suitable method that delivers at least some of the tracer into pores in the porous particles. If the impregnated tracer composition contains a solvent, it may be removed by evaporation following impregnation.

The retaining material is applied to the tracer-impregnated particles in a form in which the retaining material at least partially penetrates at least some of the pores of the particles. Normally the retaining material is applied to the particles in the form of a hardenable liquid or a solution. The hardenable material may harden thermally. Methods of thermally applying the retaining material to the tracer-impregnated particles include (a) solidification of melted retaining material by decreasing the temperature, (b) by a chemical reaction which causes bonds to form which alter the physical state of the material from liquid to solid by increasing the melting point of the material—that is, polymerisation, or (c) by the removal of some constituent of the material (for example, solvent) which causes a reaction of the parts or the mixture which remain which causes bonds to form which alter the physical state of the material from liquid to solid by increasing the melting point of the material. When the retaining material is a curable polymer, such as a polyurethane, an epoxy resin or another thermosetting polymer, it is applied to the particle as a liquid precursor, incorporating the monomer or cross-linkable polymers which is then cured in the presence of a cure catalyst and/or a cross-linking agent. When the precursor mixture is curable by heat or light the material is cured in a step involving the application of heat or light to the particles after the precursor material in placed on the particles. When the retaining material is a thermoplastic polymer or wax it may be applied in the form of a molten material and then cooled to form a solid. The retaining material may also be applied to the particles as a solution which is then dried by evaporation of the solvent.

The method of application of the retaining material is selected according to the requirements of the materials used. Application methods which can be used to treat the particles with a liquid precursor of the retaining material include the use of a fluidised bed, tumbling or stirring the particles with liquid.

The tracer particles may be used as, or with, proppant particles, whereby they are added to a fracturing fluid treatment and forced into fractures created in a rock formation. The tracer particles normally remain in the fracture and may release the tracer compound from the particles when the particles are in contact with a flow of hydrocarbon fluid. Normally the tracer particles would be used with other proppant particles so that only a proportion of the particles forced into a fracture would be tracer particles. The proportion of tracer particles to proppant that does not contain tracer can depend upon a number of factors, such as the sensitivity of the analytic method used to detect the tracer, the production rate of the well (which can affect the release rate and the amount of dilution of the tracer) and the length of time that a detectable release of tracer into the production fluid is desired. One of skill in the art would be able to determine the proportion of tracer particles to proppant that does not contain tracer based on these factors.

Figure 8B:
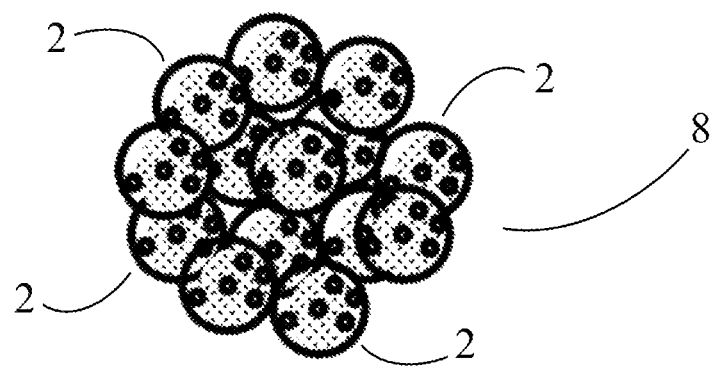
FIG. 8B shows an agglomerated object comprising a plurality of the particles.

The tracer particles may alternatively be placed at locations within a well associated with the completion apparatus, e.g. filters, well liners etc. For such applications, the tracer particles may be placed in a container which is suitably perforated in order to allow the well fluids access to the particles whilst retaining the particles within the container. As an alternative embodiment, as shown in FIG. 8B, the tracer particles 2 may be joined together to form an agglomerated object 8. In particular, the particles may be formed into one or more shaped agglomerates which can be placed within a well. Such shaped agglomerates may, for example, take the form of strips or mats which are formed by moulding the particles into the required shape with a binder to bind the particles to each other. The binder may be of the same composition as the retaining material. This can be achieved by applying more of the retaining material than is absorbed into the pores so that the retaining material is present on the surface of the particles. The particles are placed in a mould before the retaining material is solidified. Alternatively the binder may be of a different composition from the retaining material. In such a case the binder may, if required, be selected to be broken down on contact with the well fluids if it is required to release the particles from the agglomerated article when the article has been placed in the well.

The particulate tracer material described above, when used in oil wells, can provide detectable levels of one or more tracers in production fluids for periods of at least 3 months, at least 6 months, at least 9 months, at least 12 months, at least 15 months, at least 18 months, at least 21 months or at least 24 months. The invention will be further described in the following examples.

EXAMPLE 1

1 kg of XR99™ calcined moler earth adsorbent particles (available from Lubetech) were mixed with a solution containing 80 g of a halogenated aromatic compound (tracer) in acetone (482 g) until all of the particles were evenly coloured. This material was then dried at 60° C. under vacuum. This material was fluidised in a 2 ft chimney using compressed air. The flow of air was used to blow off excess tracer from the particles. Excess tracer is tracer that remains on the surface of the particles and is easily removable, such as by air. A sample of the tracer particles was taken as an uncoated control. A mixture of a commercial bisphenol-A-(epichlorhydrin) epoxy resin (35 g), its recommended hardener (7 g), and a solvent (50 g) was slowly added to a bed of 200 g of tracer containing particles, maintaining the fluid nature of the bed by adjusting the air flow. Once all the liquid was added, the air flow was maintained for 1 minute. The particles were then cured at 60° C. for 2 hours. The cured particles were free-flowing, not adhered to one another and not tacky. The epoxy represented 17.4% of the total mass of the final particles.

Elution testing was carried out as described below.

The release properties of the cured epoxy-treated tracer particles were compared with the uncoated control particles by testing in the following manner. Two identical glass columns were filled with tracer particles and sand in the following proportions.

|  | Epoxy-coated particle column (according to the invention) | Uncoated particle column (comparison) |
|---|---|---|
| Sand (g) | 19.44 | 19.96 |
| Tracer particles (g) | 2.62 | 2.64 |
| Bed length (cm) | 20.3 cm | 21.3 |
| Bed volume (cm$^3$) | 15.9 | 16.7 |

Figure 1:
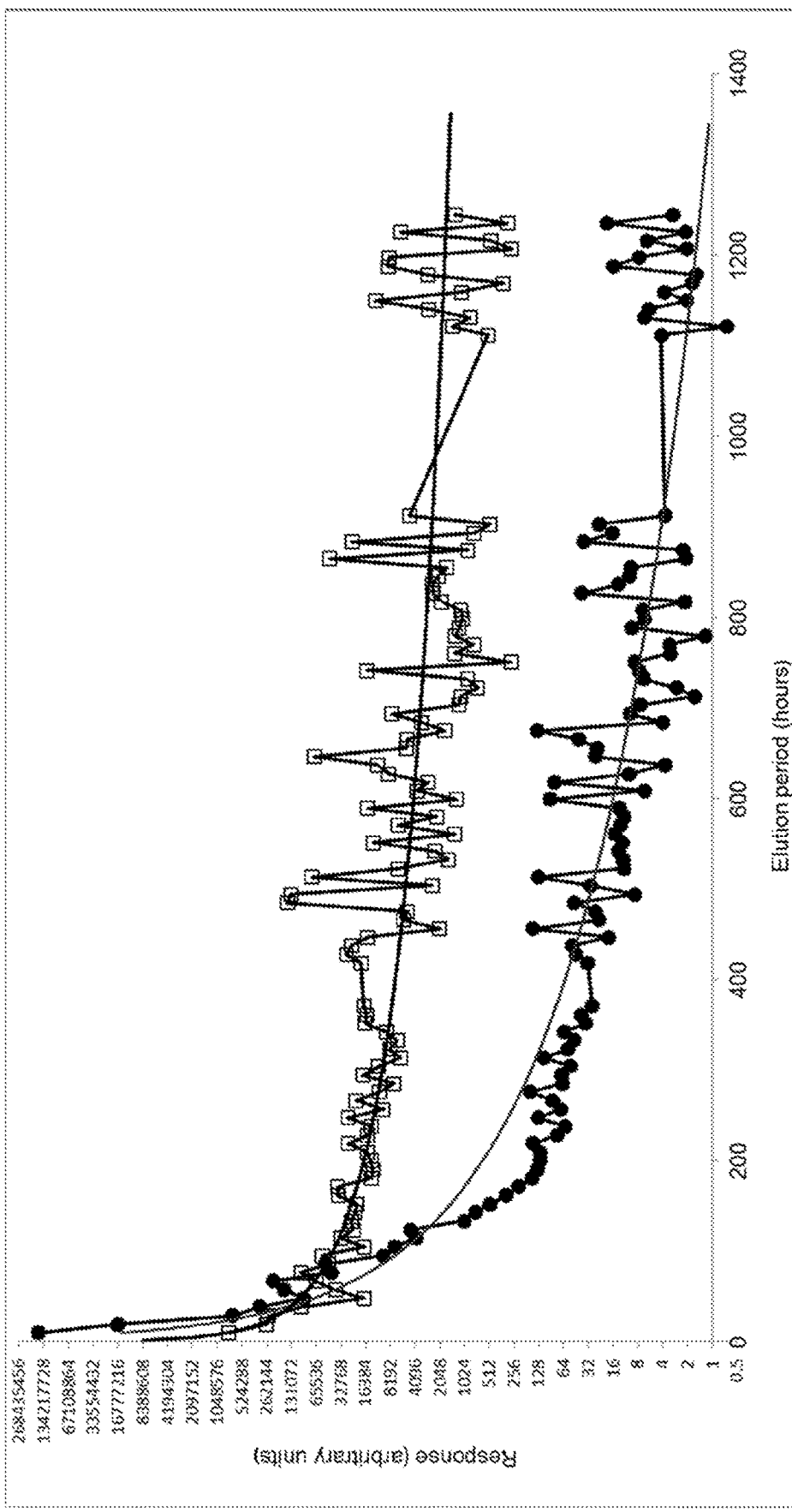
FIG. 1 illustrates the results of a comparison between the release properties of cured epoxy-treated tracer particles and the release properties of uncoated control particles, plotted as logy (arbitrary units, representing the GC peak area) vs. elution period in hours.
Figure 2:
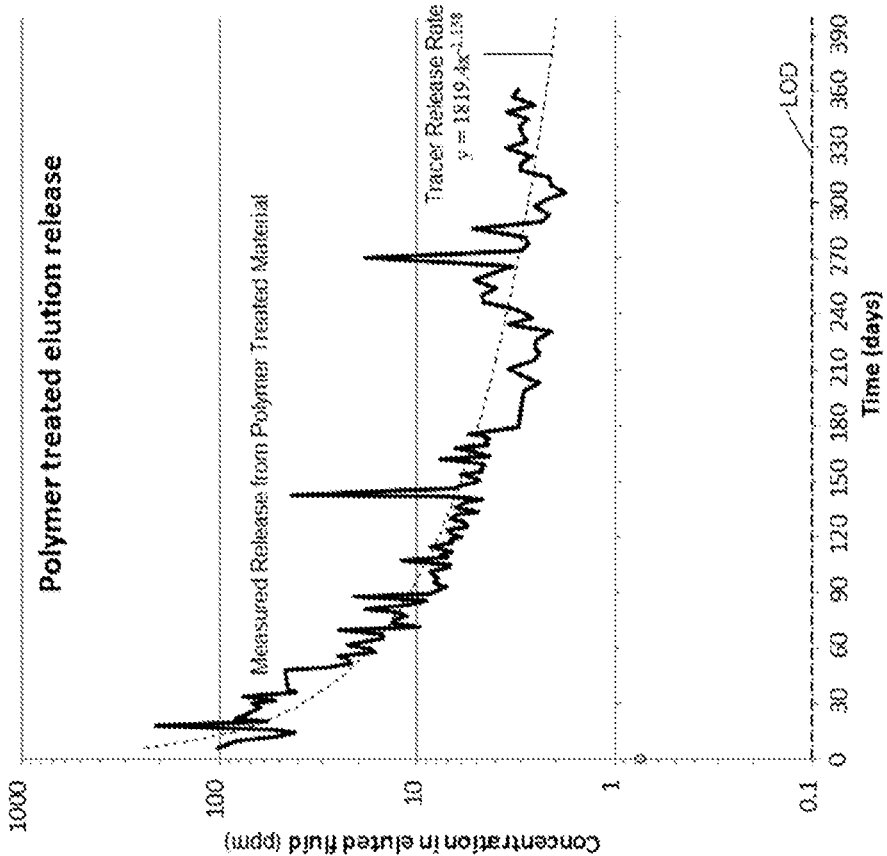
FIG. 2 depicts the results of the same comparison between the release properties of cured epoxy-treated tracer particles and the release properties of uncoated control particles, plotted as concentration (ppm) versus elution time in days.

A mixture of 10% xylene in Lotoxane™ was pumped through each column from the bottom at a rate of 5.2 mL/day (approximately 0.22 mL/h) for 52 days. Lotoxane™ is a solvent blend containing from 60-100% aliphatic hydrocarbons that does not contain aromatic hydrocarbons. The main advertised use of this material is as a degreaser and cleaning solvent. The composition of reservoir fluids varies greatly between reservoirs around the world. A commonality among the reservoir fluids is the presence of both linear and aromatic hydrocarbons in various percentages, normally between 5 and 20%. The mixture of xylene and aliphatic hydrocarbons was selected as a representative fluid which would allow representative results to be generated. The flow rate of the eluent through the bed containing the tracer particles was selected as being representative of flow rates found in fractures in fracked (stimulated) wells. Samples (2.1 mL of eluent) were collected every 9.5 hours with an auto-sampler and timer and analysed using gas-chromatography—mass spectrometry. The results are plotted in FIG. 1 as log$_2$ (arbitrary units, representing the GC peak area) vs elution period in hours and in FIG. 2 as concentration (ppm) versus elution time in days. FIG. 2 also contains a mathematical description of the tracer release rates based on a power fit using Excel.

The results show that the sample containing cured epoxy resin has a slower release rate and continues to release the tracer compound above the limit of detection for a significant period of time, greater than 49 days. FIG. 2 shows that from about 10 days to about 21 days, the concentrations of tracer in eluent from polymer treated samples were about two orders of magnitude greater that those from samples that had not been polymer treated. After about 21 days, the concentrations of tracer in the eluent from control samples fluctuated around the limit of detection, while the concentrations of tracer in eluent from polymer treated samples were between two and three orders of magnitude above the limit of detection.

The mixture of aliphatic and aromatic hydrocarbons continued to be eluted through the column containing the samples treated with the polymer for a total of 361 days, with sampling collected and assayed being conducted over longer time intervals. The results are plotted in FIG. 3. The concentrations of tracer in the eluent were at levels of about 20 times the limit of detection (0.1 ppm) after one year. From about 90 days to about 361 days, the concentrations of tracer in the effluent were between about 2 and 10 ppm.

The measured release of the tracer from the polymer treated sample was fit to a power function using Excel. The calculated release is shown in the dashed line in FIG. 3. The correlation coefficient ($R^2$) was 0.8531, indicating that there is a strong correlation between the concentration of tracer in the eluent and time.

Figure 4:
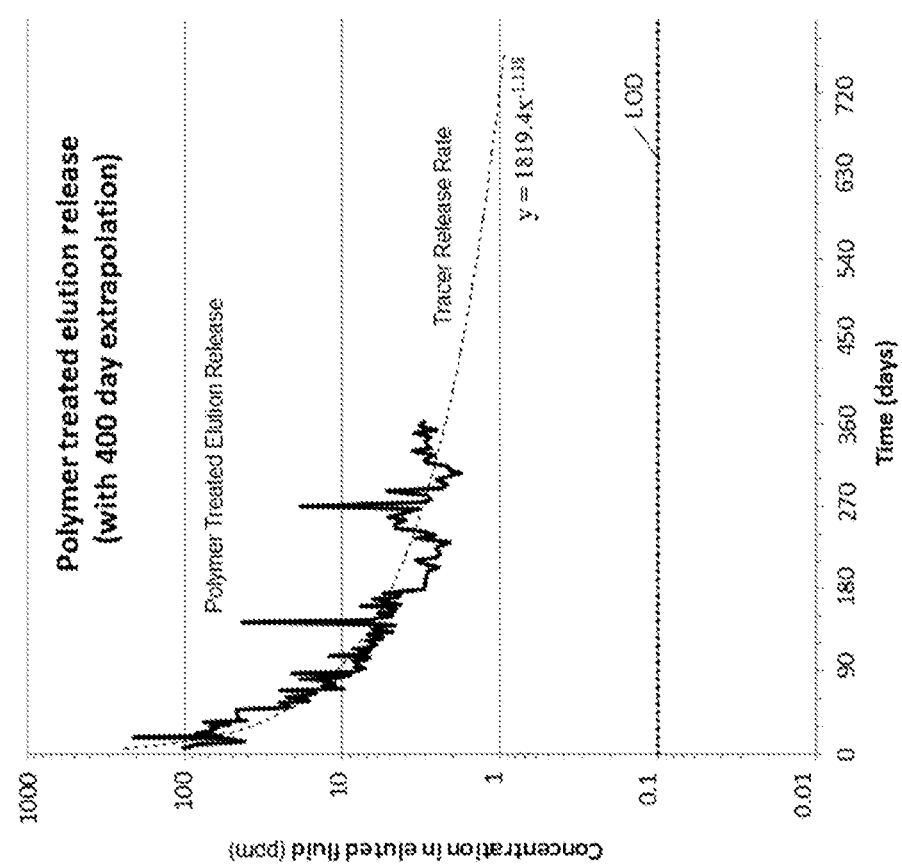
FIG. 4 provides extrapolation of the data from FIG. 3 for 400 days after the 361 days experimental period.

Extrapolation of this data for 400 days after the 361 days experimental period (FIG. 4) shows that the concentration of tracer in eluent released from the polymer treated material would be expected to remain above 1 ppm, 10 times the limit of detection, for about 720 days after the samples were exposed to the eluent. Therefore, one can expect that under the conditions of this test, the treated samples would be able to elute tracer into the eluent at levels about 10 times the limit of detection for at least two years after initial exposure to the eluent. Currently a standard test methodology for evaluating the elution of tracer from a material does not exist. However, based on the data presented herein, polymer treated compositions containing about 8% tracer as described herein, are expected to be able to release tracers into reservoir fluids under real world conditions at detectable levels for at least 3 months, at least 4 months, at least 6 months, at least 9 months, at least one year, at least 15 months, at least 18 months, at least 21 months, or at least 2 years. These release times are much longer than currently used systems. The epoxy resin has therefore retarded the release of the tracer compound from the tracer particles.

Figure 3:
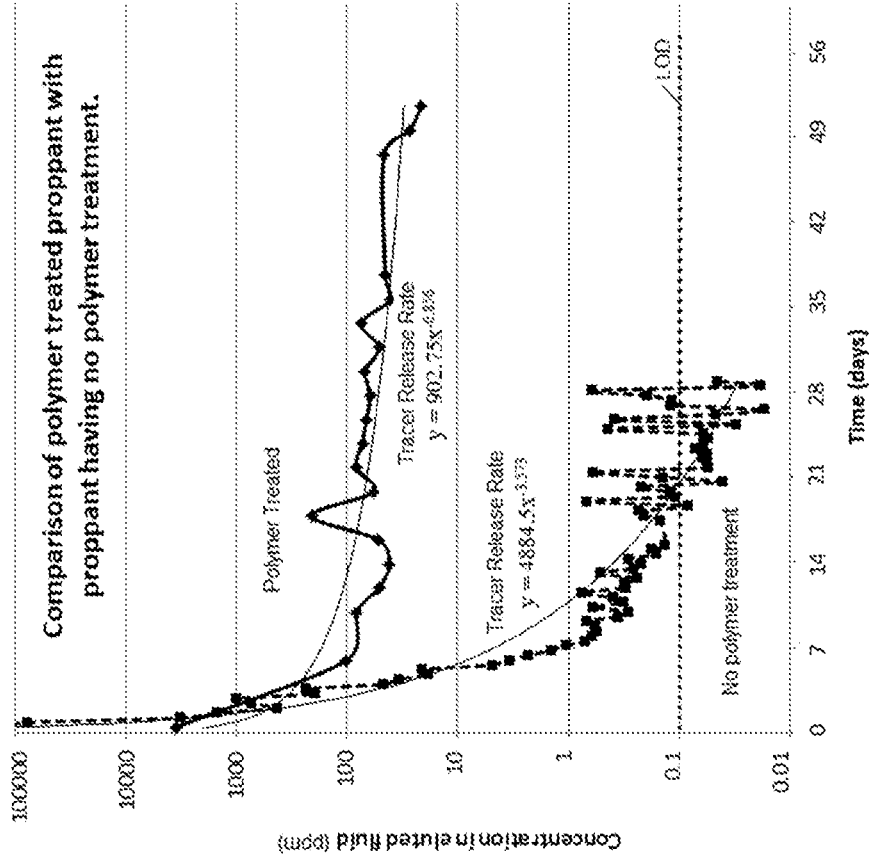
FIG. 3 provides the results of an assessment of the release properties of the cured epoxy-treated tracer particles and the uncoated control particles, respectively, over longer time intervals.
Figure 5:
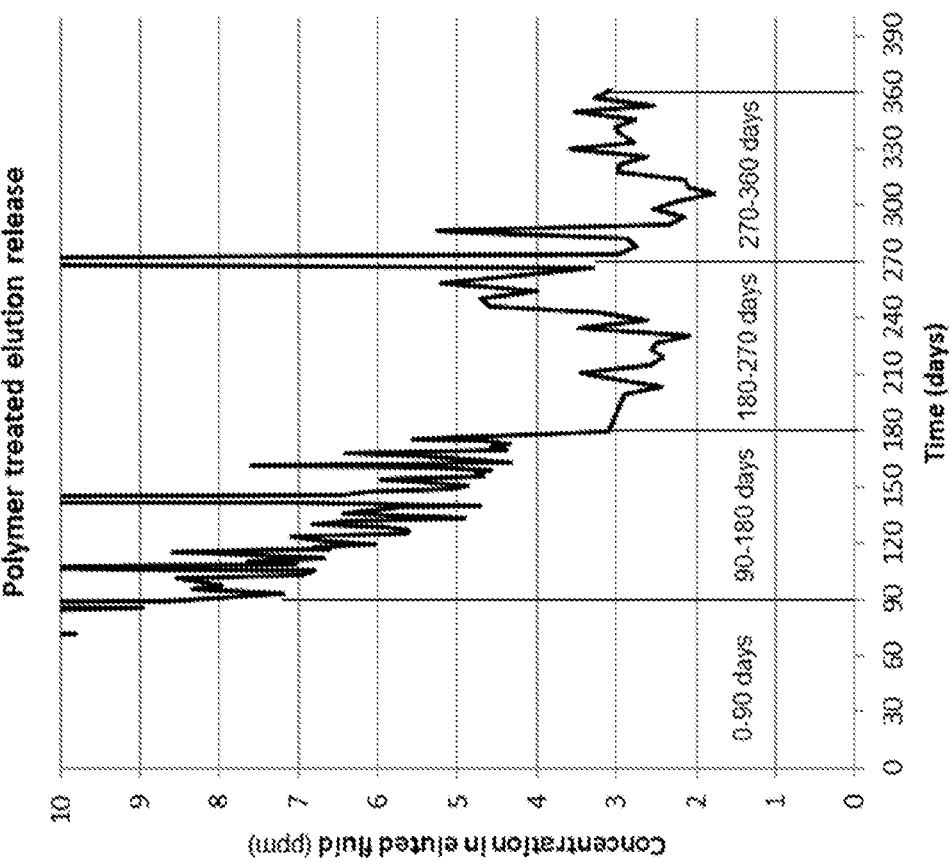
FIG. 5 is a plot of the concentration of tracer in the eluent versus time using the same data as shown in FIG. 3.

FIG. 5 is a plot of the concentration of tracer in the eluent versus time using the same data as shown in FIG. 3. FIG. 5 has the concentration plotted on a normal Y-axis, while FIG. 1 had the concentration in the eluent plotted on a logarithmic axis. FIG. 5 focuses on the concentrations of tracer in the eluent at three time intervals: 90-180 days (3-6 months), 180-270 days (6-9 months) and 270-360 days (9-months to a year). From 90-180 days, the measured concentrations were between about 3 and 8 ppm, with the average concentration being at about 6 ppm. From 180-270 days and from 270-336 days, the minimum concentrations were about 2 ppm. The average concentrations from 180-270 days and from 270-360 days (disregarding the high value at about 270 days) were about 3.2 ppm and 2.8 ppm, respectively.

The amount of the applied dose in the eluent on a single day was calculated by (1) determining the amount of tracer in the eluent and then (2) dividing the amount of tracer in the eluent by the amount of tracer applied to the tracer composition. With the flow rate of eluent of 5.2 mL/day, a concentration of 1 ppm of tracer in the eluent is equivalent to 0.0052 mg of tracer released per day. The tracer composition, including the weight of the tracer, had a weight of 2.62 grams. Tracer had been present on the tracer composition at a loading of about 8%, or 210 mg. Therefore a concentration of 1 ppm in the eluent is equivalent to a release of about 0.0025% of the applied dose. The amount of the applied dose released per day was calculated by multiplying 0.0025 times the concentration in ppm of the tracer in the effluent. The results are shown in the table below, where the average concentration is the average concentration of the tracer in the effluent over the 90 day time period.

| Time Period (Days) | Minimum Conc. (ppm) | Average Conc. (ppm) | Minimum % of Applied Dose | Average % of Applied Dose |
|---|---|---|---|---|
| 90-180 | 3 | 6 | 0.0075 | 0.015 |
| 180-270 | 2 | 3.2 | 0.005 | 0.008 |
| 270-360 | 2 | 2.8 | 0.005 | 0.007 |

A particulate tracer material releases the tracer into an eluent in an amount of at least 0.005% of the applied amount of tracer per day over a period of at least a 90-180 days when the tracer had been present on the tracer composition at a loading of 8% and the eluent contacts a mixture of particulate tracer material and sand at a flow rate of 5.2 mL/day.

Based on the results shown above, the particulate tracer material described herein can provide release for at least 3 months, at least 4 months, at least 6 months, at least 9 months, or at least one year of measureable concentrations of a tracer in eluent from a sand column containing the particulate tracer material when the particulate tracer material is placed in a column of sand as described above and eluted with a mixture of 10% xylene in Lotoxane™ at a rate of 5.2 mL/day. The amount of tracer eluted per day is at least 0.005% of the amount of tracer loading in the particulate tracer material. The amount of tracer released over days 90-180 days after the beginning of the elution can be at least 0.005% of the amount of tracer loading in the particulate tracer material. The average amount of tracer eluted per day during 90-180 days, 180-270 days and 270-360 days after the beginning of the elution can be at least 0.015%, at least 0.008% and at least 0.007%, respectively, of the amount of tracer loading in the particulate tracer material.

EXAMPLE 2

150 g of the tracer particles made in Example 1 were mixed with 50 g of pre-mixed epoxy resin. Mixing continued until all particles were wetted and a semi-dry slurry was formed. The slurry was poured into a mould (5×10 cm) and covered with an internally fitting lid. The mould was shaken to distribute the particles. A pressure of 50 g/cm$^2$ was applied to the lid by means of weights and the mould placed in an oven at 60° C. to cure. Once cured the block was removed from the mould. The resulting block was permeable to liquids and gases as shown by being able to pass air through it.

EXAMPLE 3

Figure 6:
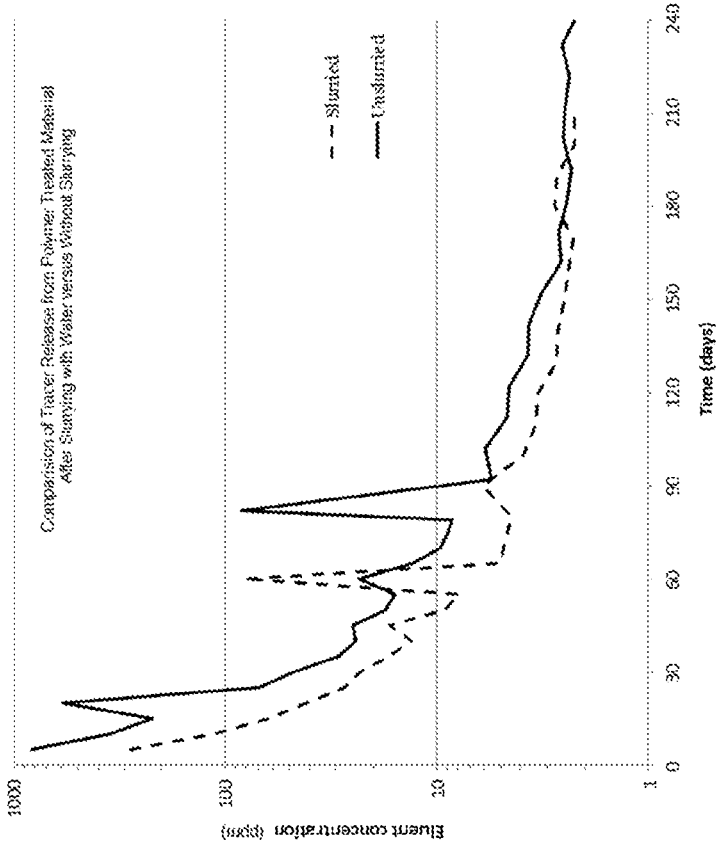
FIG. 6 provides the results of an evaluation of the respective release profiles of four samples of polymer-treated particles, each sample containing a different tracer material.

Four samples of polymer treated particles, each containing a different tracer, were prepared by dissolving the tracer in acetone and adding 40 g of XR99™ calcined moler earth adsorbent particles. The loading of the tracers on the particles was about 10%. The mixture of the tracer solution and the adsorbent particle was stirred, and then the acetone was removed under vacuum with heat. The four samples of tracer containing particles, each containing a different tracer, were the blended together in a fluidized bed for about 15 minutes. A mixture of epoxy, amine hardener and acetone in a ratio of 5:1:0.8 was added to the blend of tracer particles and stirred until the color of the particles was consistent. After the epoxy cured, the mixture of epoxy-coated tracer particles (4.08 g) was mixed with sand (23.8 g), packed in a column, eluted and analysed as described in Example 1. Analysis was conducted of samples eluting every 10 days from day 80 through day 242. FIG. 6 shows the results of the analysis. All four tracers were present in the eluent at concentrations above the limit of detection from days 80 through 242, with three of the tracers being present at concentrations at least 20 times greater than the limit of detection throughout the sampling. The release profile of each the four tracers changed shape at about 90 days and slowed, as indicated by the flatter shape of the profiles from about 90 days through about 242 days. These results show that the coated tracer containing particles can provide for the release of multiple tracers over a longer period of time than currently exist.

EXAMPLE 4

Figure 7:
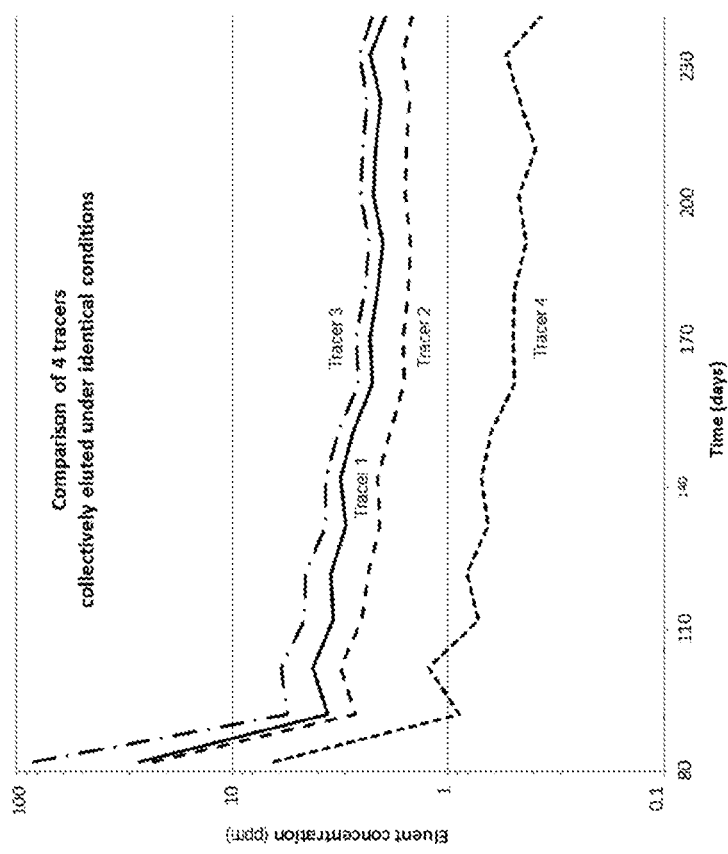
FIG. 7 provides the results of an evaluation of the release characteristics of a mixture of polymer-treated particles with respect to a single tracer material.

A mixture of polymer treated particles (4.08 g) containing multiple tracers as described in Example 3 and sand (23.8 g) was slurried with a liter of water, then packed in a column, eluted and analysed as described in Example 1. Analysis was conducted of samples eluting at various times through day 210 (slurried) and day 242 (unslurried). FIG. 7 shows the results of the analysis for one of the tracers. The slurried polymer treated particles released less tracer over the first about 150 days than the unslurried polymer treated particles. Regardless of whether the polymer treated particles had or had not been slurried with water the release of tracer from the polymer treated particles after about 240 days was sufficient to produce concentrations of the tracer in the eluent that were at least 20 times the limit of detection (0.1 ppm). This shows that exposure of polymer treated particles to water during injection of the particles into a well would still allow the polymer treated particles to maintain the release of tracer over long periods of time, such as 8 months or more.

The invention claimed is:

1. A particulate tracer material comprising
a plurality of particles of a porous particulate solid material, said particles having a surface portion and having pores containing a tracer composition,
wherein a retaining material overlies said tracer composition in at least some of said pores, said retaining material retarding the rate of discharge of the tracer compound from the tracer material compared with the rate of discharge from a similar tracer material in the absence of the retaining material,
wherein particles of said particulate tracer material are joined together by a binder that is a different composition from the retaining material in order to form an agglomerated object by moulding the particles of tracer material into a desired shape with the binder in order to bind the particles of tracer material together and,
wherein the binder is configured to be broken down on contact with well fluids to release the particles from the agglomerated object when the agglomerated object has been placed in a well.

2. The particulate tracer material according to claim 1, wherein said porous particulate solid material comprises an inorganic oxide material.

3. The particulate tracer material according to claim 2, wherein said porous particulate solid material comprises silica, alumina, an aluminosilicate, porous glass, calcium carbonate, clay, sepiolite, kaolin, bentonite, attapulgite, halloysite, diatomaceous earth, activated carbon, zeolite, moler earth, or fullers earth.

4. The particulate tracer material according to claim 1, wherein said tracer composition comprises a dye, a fluorescent material, a halogenated aromatic compound, a cycloalkane, or a halogenated aliphatic compound.

5. The particulate tracer material according to claim 1, wherein said tracer composition comprises a solid or liquid which is soluble in or miscible with a hydrocarbon fluid or an aqueous liquid.

6. The particulate tracer material according to claim 1, wherein said tracer composition comprises more than one tracer compound.

7. The particulate tracer material according to claim 1, wherein said retaining material comprises a polymeric material or a waxy organic material.

8. The particulate tracer material according to claim 7, wherein said retaining material comprises a polyurethane, an epoxy resin, a polyester, an acrylic material, polyvinyl acetate, polyvinyl alcohol, a formaldehyde-based resin or a cellulose derivative.

9. The particulate tracer material according to claim 1, wherein the particles of said particulate tracer material are free-flowing.

10. The particulate tracer material according to claim 1, wherein the particulate tracer material releases the tracer into an eluent in an amount of at least 0.005% of the applied amount of tracer per day over a period of at least 90-180 days when the tracer had been present on the tracer composition at a loading of 8% and the eluent contacts a mixture of particulate tracer material and sand at a flow rate of 5.2 mL/day.

11. A method of tracing a flow of fluid from a hydrocarbon reservoir comprising the steps of
    collecting a sample of fluids flowing from a well penetrating said reservoir comprising a particulate tracer material according to claim 1 and a tracer composition, and
    analysing said sample to determine the presence or absence of said tracer composition.

12. The method of claim 11, wherein a plurality of samples of fluids flowing from the well are analysed over a period of time and the concentrations of one or more tracers in the reservoir fluids are determined over time.

13. The method according to claim 11, wherein said particulate tracer material is placed within a fracture in a rock formation forming said reservoir or within, or attached to, a well completion apparatus installed within said well.

14. The method according to claim 11, further comprising determining the concentration of one or more tracers in fluids flowing from the well.

15. The particulate tracer material according to claim 1, wherein the retaining material is present in at least a portion of the pores of the particles.

16. A method of making a particulate tracer material comprising the steps of:
    a. impregnating a plurality of particles of a porous particulate solid material with a tracer composition in the form of a liquid or a solution,
    b. contacting said particles with a liquid precursor to form a retaining material,
    c. treating the resulting particles to form a solid retaining material from said liquid precursor, and
    d. forming said particles into an agglomeration of particles before or after step c, using a binder that is a different composition from the retaining material to join the particles together to form the agglomeration by moulding the particles into a desired shape with the binder in order to bind the particles together, wherein the binder is configured to be broken down on contact with well fluids to release the particles from the agglomeration when the agglomeration has been placed in a well.

17. The method according to claim 16, further comprising removing a solvent from said particles before step (b).

* * * * *